(12) United States Patent
Czysz

(10) Patent No.: US 7,578,514 B2
(45) Date of Patent: Aug. 25, 2009

(54) COAXIAL STEERING AND SUSPENSION FOR MOTORCYCLE

(75) Inventor: Michael Czysz, Portland, OR (US)

(73) Assignee: Motoczysz LLC, Portland, OR (US)

( * ) Notice: Subject to any disclaimer, the term of this patent is extended or adjusted under 35 U.S.C. 154(b) by 0 days.

(21) Appl. No.: 11/506,532

(22) Filed: Aug. 18, 2006

(65) Prior Publication Data

US 2006/0279059 A1 Dec. 14, 2006

Related U.S. Application Data

(63) Continuation of application No. 10/633,381, filed on Jul. 31, 2003, now Pat. No. 7,111,700.

(51) Int. Cl.
*B62K 21/02* (2006.01)
*B62K 21/04* (2006.01)

(52) U.S. Cl. ...................... 280/276; 280/279

(58) Field of Classification Search ........... 280/274, 280/275, 276, 277, 279, 280, 283; 180/219; 188/24.12; 301/125
See application file for complete search history.

(56) References Cited

U.S. PATENT DOCUMENTS

| | | | | |
|---|---|---|---|---|
| 1,452,436 A | * | 4/1923 | Pullin | 280/276 |
| 2,233,313 A | * | 2/1941 | Hazelroth | 280/276 |
| 4,526,249 A | * | 7/1985 | Parker | 180/219 |
| 4,660,683 A | * | 4/1987 | Hayashi et al. | 188/18 A |
| 5,069,467 A | * | 12/1991 | Claudio | 280/276 |
| 5,449,155 A | * | 9/1995 | Mack | 267/292 |
| 5,509,674 A | * | 4/1996 | Browning | 280/276 |
| 5,509,676 A | * | 4/1996 | Fukutake et al. | 280/276 |
| 5,749,590 A | * | 5/1998 | Roerig | 280/276 |
| 5,855,388 A | * | 1/1999 | Brewer | 280/288.4 |
| 6,017,047 A | * | 1/2000 | Hoose | 280/276 |
| 6,145,637 A | * | 11/2000 | Hopey | 188/306 |
| 6,241,391 B1 | * | 6/2001 | Hoose | 384/49 |
| 6,260,870 B1 | * | 7/2001 | Fan | 280/276 |
| 6,336,647 B1 | * | 1/2002 | Iwai et al. | 280/276 |
| 6,357,775 B1 | * | 3/2002 | Iwai et al. | 280/276 |
| 6,371,263 B1 | * | 4/2002 | Hoose | 188/312 |
| 6,457,732 B2 | * | 10/2002 | Ito et al. | 280/277 |
| 6,488,300 B2 | * | 12/2002 | Ito et al. | 280/276 |
| 6,517,095 B1 | * | 2/2003 | Lansac et al. | 280/276 |
| 7,018,126 B2 | | 3/2006 | Henricksen | |
| 7,118,302 B1 | | 10/2006 | Durham | |
| 7,178,820 B2 | * | 2/2007 | Terblanche | 280/276 |
| 2008/0129009 A1 | | 6/2008 | Czysz | |

* cited by examiner

*Primary Examiner*—Christopher P Ellis
*Assistant Examiner*—Marc A Scharich
(74) *Attorney, Agent, or Firm*—Chernoff, Vilhauer, McClung & Stenzel, LLP

(57) ABSTRACT

A motorcycle or bicycle front end having coaxial steering and suspension components, and having telescopic forks. Swing weight of the forks is dramatically reduced by removing their suspension components to the central location, coaxially within the steering tube. Ride height can be adjusted without loosening the forks in the triple clamps.

19 Claims, 5 Drawing Sheets

COAXIAL STEERING AND SUSPENSION FOR MOTORCYCLE

RELATED APPLICATIONS

This is a continuation of application Ser. No. 10/633,381 "Coaxial Steering Suspension for Motorcycle", filed Jul. 31, 2003 now U.S. Pat. No. 7,111,700 by this inventor.

BACKGROUND OF THE INVENTION

1. Technical Field of the Invention

This invention relates generally to suspension components for two-wheeled vehicles, and more specifically to front steering and front spring/shock components.

2. Background Art

The vast majority of motorcycles (and full- and front-suspension bicycles) are equipped with front suspensions in which a pair of telescopic forks are coupled to the steering head of the motorcycle's frame by an upper triple clamp and a lower triple clamp. The triple clamps provide enough lateral offset that the forks clear the sides of the front tire. The triple clamps are usually constructed to provide some measure of longitudinal offset, as well, to increase trail and thereby stabilize the motorcycle. Trail is a measurement, on the ground, from a point projected through steering axis to the center of the tire's contact patch directly below the axle, and determines the self-centering stability of the steering. The forks are either of the "right-side-up" or sliding-female configuration, or the "upside-down" or sliding-male configuration. In either case, a cylindrical tube or piston slides axially within a cylindrical cylinder.

In nearly all cases, both the suspension springs and the damping or shock absorbing components are disposed within one or both of the sliding tube assemblies. Unfortunately, because the substantial mass of the springs, dampers, oil, and other related suspension components is located a significant distance—generally in the neighborhood of 2.5 inches—from the axis of the steering head, the front end has an undesirably large moment of rotational inertia. In other words, the front end has a heavy "swing weight" which reduces both the "feel" and the responsiveness of the front end.

Alternative front end configurations have occasionally been seen, but all suffer from this same malady, and their inventors have been attempting to solve other problems, such as front end "dive" under hard braking, rather than reducing the moment of rotational inertia. Examples include the well-known BMW Telelever, the Britten front end, the Hossack front end, the RADD-Yamaha front end, and various hub-center systems such as that found on the Bimota Tesi.

None of these previous geometries places the spring or damper components coaxial to the steering head, and all suffer from having stylistic, aesthetic appearances which are dramatically different than the almost universally preferred conventional dual fork system. Furthermore, all are significantly more complex than the conventional dual fork system. The downside of these previous systems, such as increased mass, outweigh any benefit they may have offered on other fronts.

Fork flex, especially under braking, is a significant contributor to the stiction which is known to dramatically reduce the effectiveness and perceived quality of a motorcycle's front suspension.

What is needed, then, is a system which has the aesthetic appeal and simplicity of the dual fork geometry, with a significantly reduced moment of rotational inertia. What is further needed is a system which offers reduced stiction.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
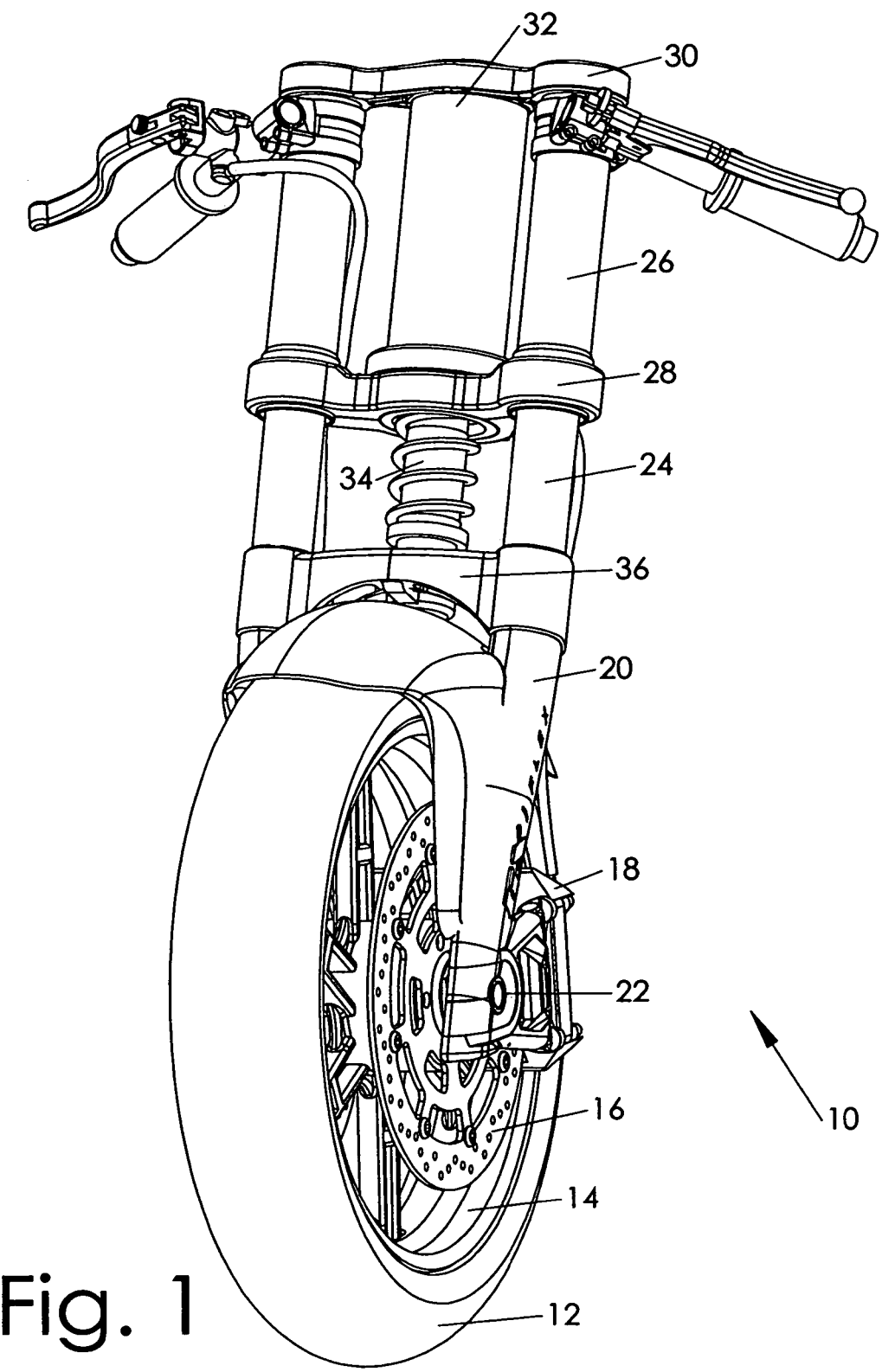
FIGS. 1-4 show various views of one embodiment of the front end and steering/suspension system of the present invention.
Figure 2:
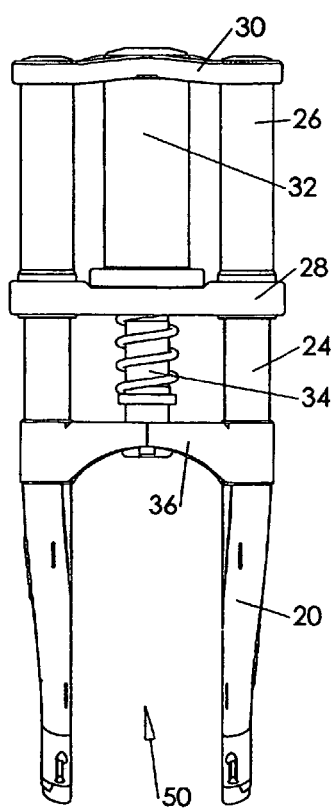
Figure 3:
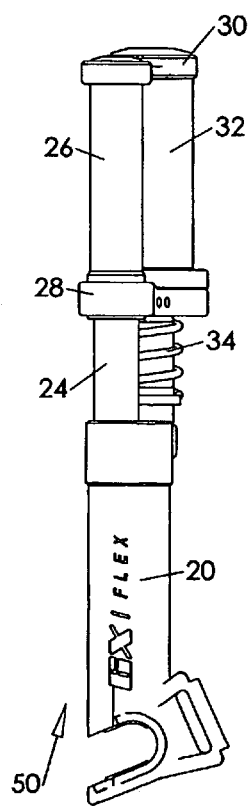
Figure 4:
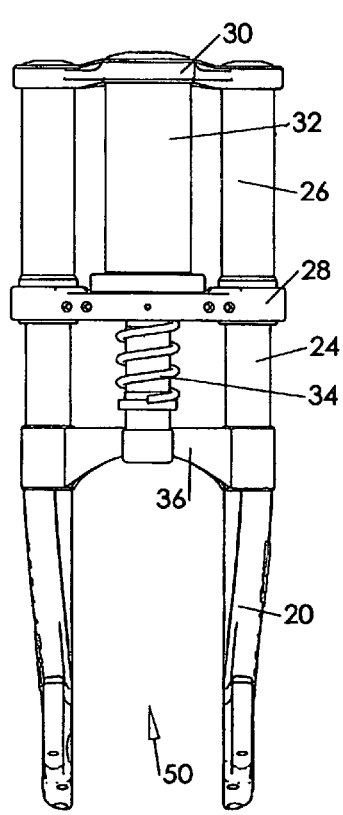

FIGS. 1-4 illustrates one embodiment of a motorcycle front end 10 and specifically the steering/suspension system 50, viewed generally from the front in FIGS. 1 and 2, the left side in FIG. 3, and the rear in FIG. 4. The front end includes a tire 12 mounted on a wheel 14 and equipped with brake rotors 16 and brake calipers 18. A fork bottom 20 includes a fork bottom body coupled to the axle 22 and to a pair of male lower fork tubes 24 which slide in a pair of female upper fork tubes 26. In other embodiments, conventional fork tubes are used, without fork bottoms. A lower triple clamp 28 and an upper triple clamp 30 are coupled to the upper fork tubes and couple them to a steering stem assembly (not visible) which rotates within a steering tube 32 which is part of, or coupled to, the frame (not shown) of the motorcycle.

The front end 10 thus pivots or rotates about a steering axis which is coaxial with the steering tube 32. This invention differs from the prior art in that at least one of the spring (suspension) and/or shock (damping) components is coaxially disposed within the steering tube. In one embodiment, a monoshock 34 provides both spring support and damping for the front end, while in other embodiments, a more conventional cartridge system (not shown) could be employed within the fork tubes. The bottom end of the monoshock is coupled to a fork buttress 36. The fork buttress may be coupled to the lower fork tubes or to the fork bottoms. In one embodiment, the fork buttress comprises two halves, each of which is integrally formed with a respective fork bottom, as shown.

Figure 5:
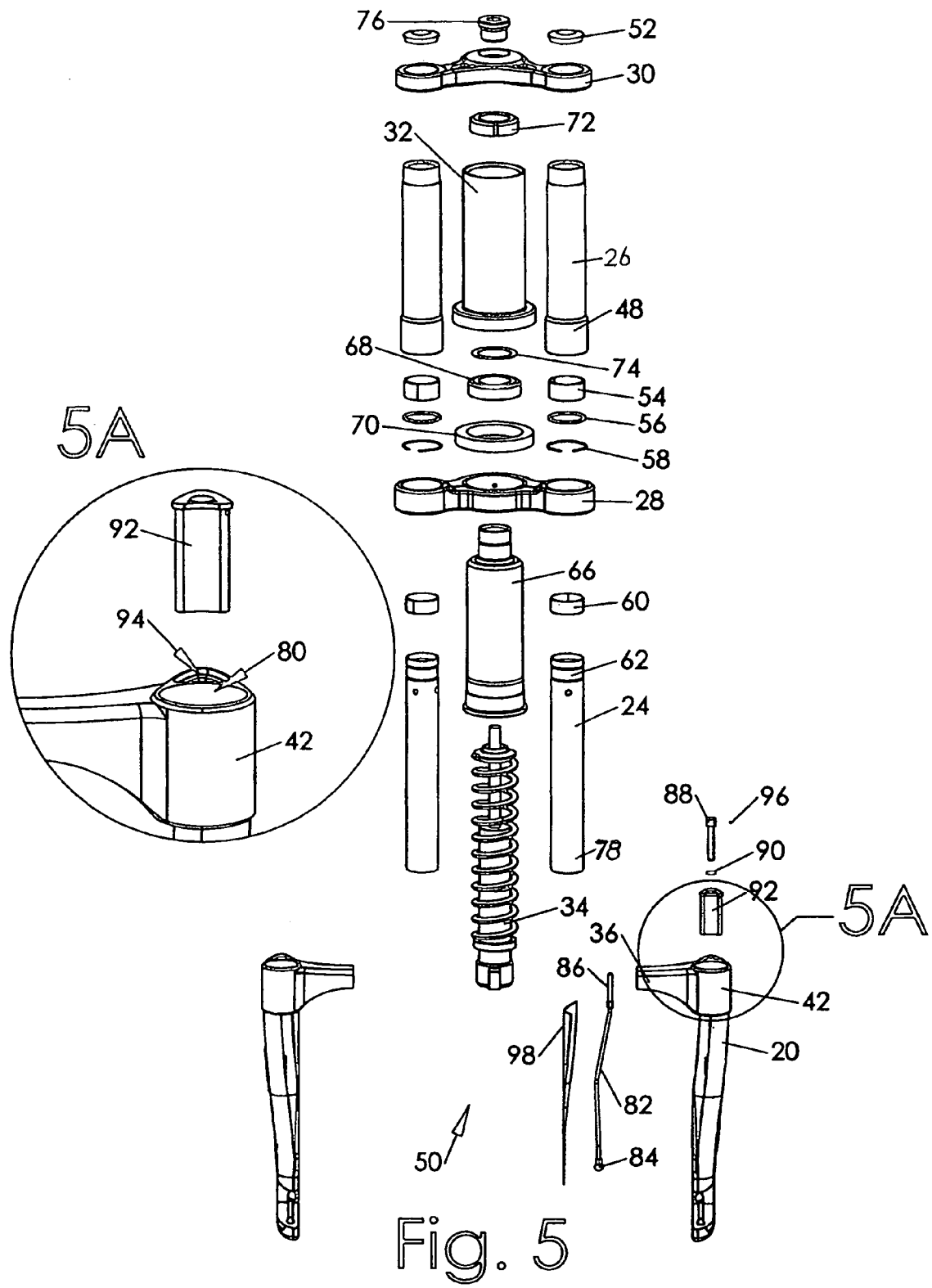
FIG. 5 shows an exploded view of the steering/suspension system.

FIG. 5 illustrates the steering/suspension system 50 of the motorcycle front end 10, viewed generally from the front and shown in an exploded view. For ease of illustration, only a single fork will be described. The upper fork tube 26 threads into the upper triple clamp 30. A fork cap 52 seals the open end of the fork tube to prevent gross contamination of the sliding components, but is not necessarily an airtight seal. A stationary fork bushing 54 and a seal 56 fit within the lower end 48 of the upper fork tube, and are held in place by a snap wire 58. A sliding fork bushing 60 mates with the upper end 62 of the lower fork tube. The stationary and sliding fork bushings provide a low-stiction but tight-tolerance sliding fit of the lower fork tube within the upper fork tube. In practice, the components may need to be assembled in a slightly different manner than suggested by this exploded view, as the bushings are not generally able to slide past each other, and their interference is part of what keeps the telescopic forks from telescoping completely to disassembly.

A shock tube 66 rotates within the steering tube 32 on an upper bearing 68 and a lower bearing 70. A jam nut 72 and washer 74 secure the upper bearing onto the shock tube. A top bolt 76 threads into the shock tube and secures it to the upper triple clamp.

The lower end 78 of the lower fork tube threads or otherwise couples to a hole 80 in the upper end 42 of the fork bottom 20. The upper end of the monoshock 34 fits up into and engages the shock tube, while the lower end of the monoshock engages the fork buttress 36 at the upper end 42 of the fork bottom.

The lateral stiffness of the fork bottom is controlled by a tension cable 82. The lower end 84 of the tension cable engages the fork bottom, while the upper end 86 of the tension cable is engaged and tensioned by a tension adjuster 88. The tension adjuster and a washer 90 engage a tension adjuster block 92 which fits into a hole 94 in the upper end of the fork bottom. A detent ball 96 retains the tension adjuster within the tension adjuster block and, in some embodiments, provides "clicker" adjustment feedback as is commonly present in other motorcycle suspension adjustments such as compression and rebound damping. For aesthetics and aerodynamics, a fork bottom inner cover 98 may be coupled to the inward portion of the fork bottom, covering the tension cable and other components.

Figure 6:
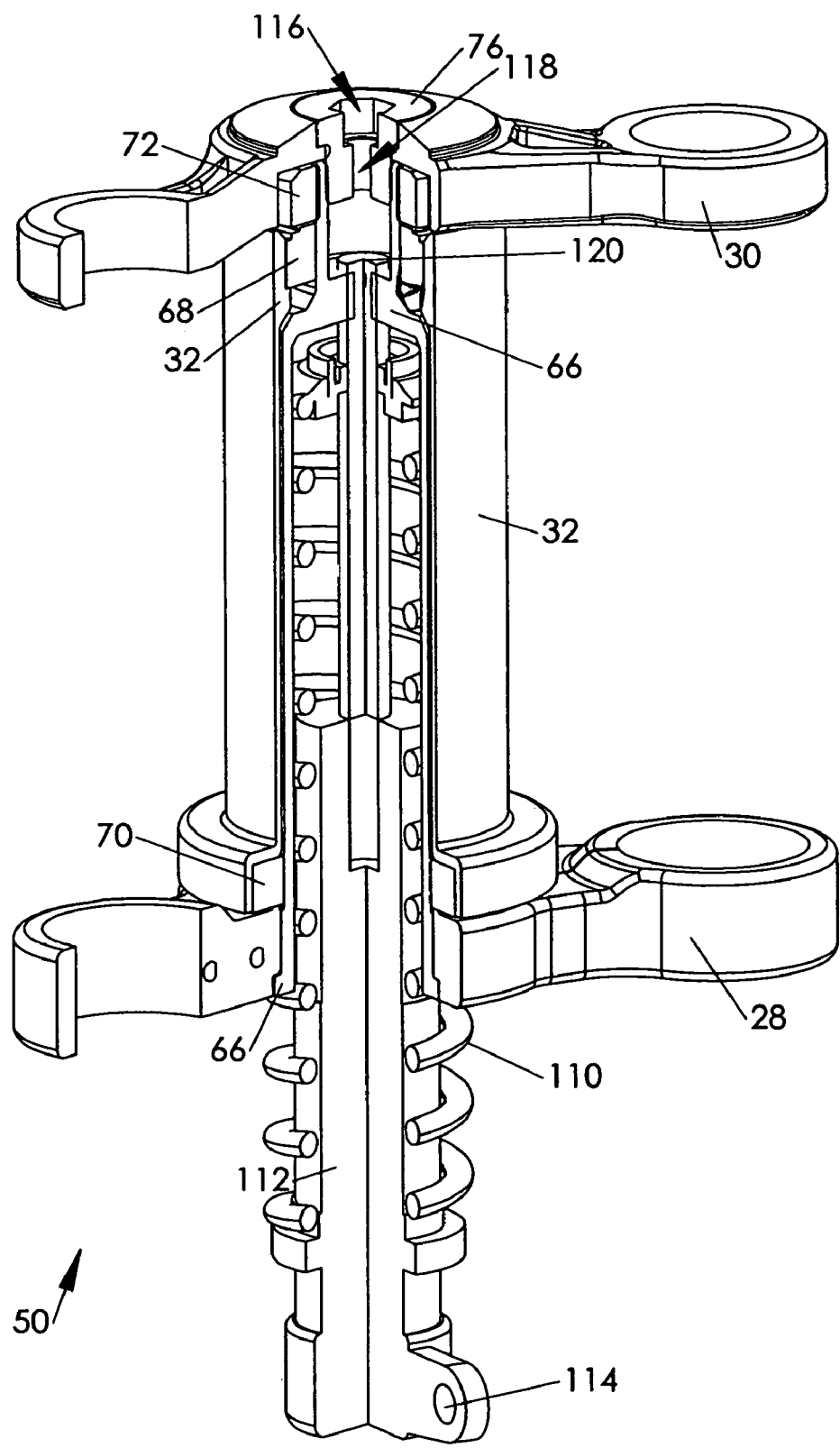
FIG. 6 shows a perspective, cutaway view of a portion of the steering/suspension system.

FIG. 6 illustrates further details of one embodiment of the steering/suspension system 50, with a cutaway for visibility into the coaxial alignment of the suspension components within the steering tube 32. The suspension components are illustrated somewhat generically and in a much simplified configuration omitting many details which are not essential to understanding this invention but which are well within the abilities of those of ordinary skill in the art. The suspension components may include one or more load-bearing components such as a coil spring 110, and one or more damping components 112. As such, the suspension components may be quite similar to a conventional rear shock such as is conventionally used in modern sportbikes, with the addition of a suitable mounting mechanism 114 adapted for coupling or mating with the fork brace (not shown) or other lower mounting component.

The suspension components are disposed coaxially with the steering tube 32, or, more precisely, coaxially with the steering axis. The shock tube 66 is disposed coaxially within the steering tube, and rides on an upper bearing 68 and a lower bearing 70. The jam nut 72 is threaded onto the shock tube. The top bolt 76 threads into the shock tube and coaxially locates the upper triple clamp 30 with respect to the steering axis. The top bolt is provided with, in one embodiment, an internal hex socket 116 by which the top nut is tightened.

In one embodiment, the top bolt is further provided with a passage 118 and the shock tube is provided with a passage, through which a tool (not shown) can be inserted to adjust various settings of the suspension components, such as compression damping, rebound damping, preload, ride height, and so forth. Again, for ease of illustration, these various adjustment mechanisms are not shown on the monoshock.

One noteworthy feature of this system is that the ride height of the front end can be adjusted by screwing threaded rod 120 up and down in the shock tube, and this is completely independent of the coupling of the forks to the triple clamps. This represents a marked improvement over the conventional fork systems, in which the rider must loosen the upper and lower triple clamps, slide or pound the upper fork tubes up and down in the triple clamps until a desired amount of protrusion is achieved, then retighten the triple clamps, while hoping that the fork tubes have not shifted and that the two fork tubes are set at exactly the same height. The coaxial monoshock adjustment of this invention enables the rider to adjust the ride height without fiddling with the triple clamps or fork tubes, and it guarantees a single, consistent setting without the possibility of maladjustment between the two forks. The same monoshock principle applies to other adjustments, as well, such as compression damping, rebound damping, and so forth.

Figure 7:
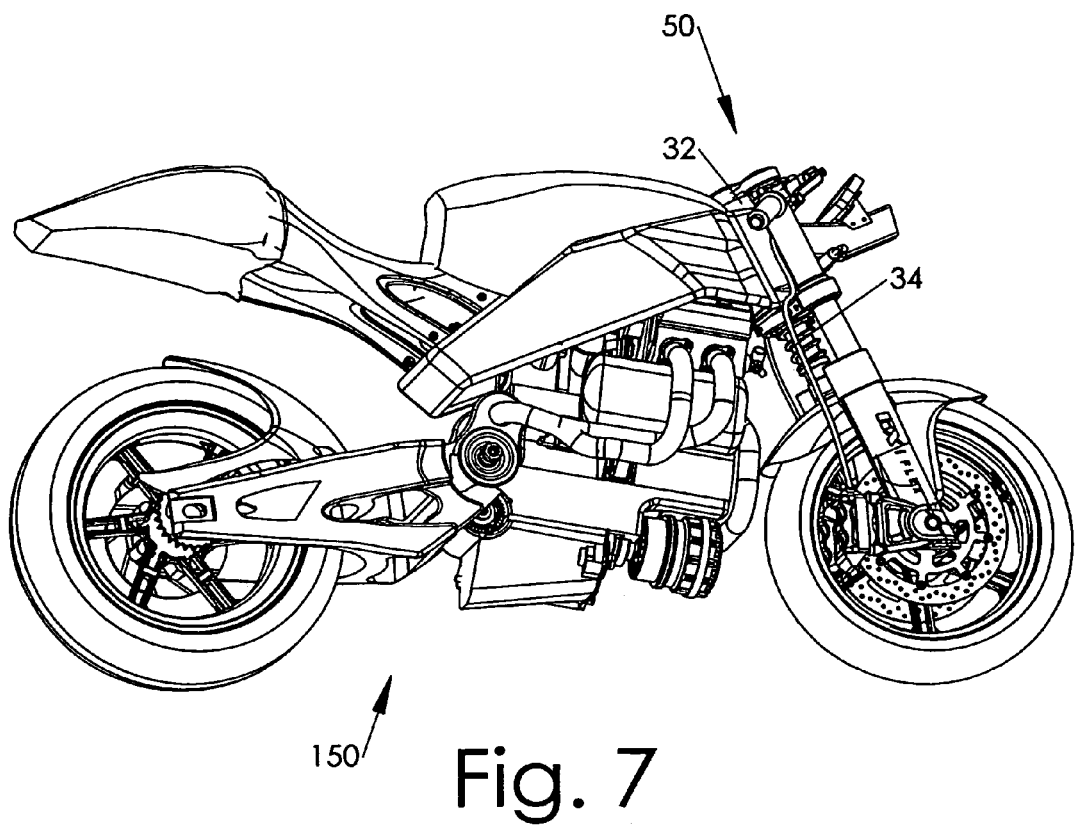
FIG. 7 shows a motorcycle having the coaxial steering and suspension front end of this invention.

FIG. 7 illustrates a motorcycle 150 having a front end with the coaxial steering/suspension system of this invention.

Conclusion

The skilled reader will readily appreciate that having the suspension components mounted coaxially with the steering head provides several significant advantages. For example: the moment of rotational inertia of the front end is reduced, versus that of a conventional front end in which the suspension components are located out in the fork tubes; only a single set of suspension components is required, and yet the suspension has the same effect at each side of the front axle, whereas putting a single set of components in e.g. only the left fork of a conventional front end would produce disastrous results; preload, rebound damping, compression damping, and ride height adjustments can be made with a single adjustment each, versus the two adjustments each that are required in a conventional front end, and can be done without loosening the forks in the triple clamps; suspension settings cannot accidentally be different on the two sides of the front end, whereas this is a constant danger with a conventional front end; stiction is reduced; and yet the familiar and desirable look and feel of a conventional dual fork front end are retained. Furthermore, it may often be the case that the total mass of the required suspension is lower when using the present invention, than when using a conventional front end.

While the invention has been described with reference to its use in a motorcycle, the invention is not limited to motorcycles, but can be used in bicycles, automobiles, and other vehicles. And while the invention has been shown as using an "upside-down" fork, it may alternatively be used with a "right-side-up" fork. Some components have been illustrated as being of monolithic construction, while other components have been illustrated as being separate components coupled together. The skilled reader will readily appreciate that the designer may elect, within the scope of this invention, to split some components into separate sub-components, or to combine various components into a monolithic whole. The skilled reader will further appreciate that the invention may be practiced in a "single-sided" front end, such as that found on some bicycles which have only a single fork. The term "triple clamp" should not necessarily be interpreted to mean that two forks are required with the steering tube. The presence of one or more suspension components coaxial with the steering axis does not necessarily prohibit the additional presence of one or more suspension components elsewhere, such as within the forks.

The sliding-tube forks may be empty, containing neither springs nor dampers, and may thus be said to have substantially inert suspension characteristics. In some embodiments, the suspension components could be located externally to the outer steering tube, rather than inside it.

While it might, at first glance, be assumed to be a negative that the steering tube must, in the present invention, be significantly larger than in a conventional front end, the opposite is actually true. Having a very large diameter steering tube, with very large diameter bearings and so forth, reduces frame torque and makes the frame stronger, especially at the points at which the rest of the frame joins the steering tube.

When one component is said to be "adjacent" another component, it should not be interpreted to mean that there is absolutely nothing between the two components, only that they are in the order indicated. The various features illustrated in the figures may be combined in many ways, and should not be interpreted as though limited to the specific embodiments in which they were explained and shown. Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A front suspension for a motorcycle comprising:
an upper triple clamp;
a lower triple clamp;
a pair of forks coupled to the upper and lower triple clamps;
a steering tube coupled to the upper and lower triple clamps; and
a shock located at least partially within the steering tube and aligned coaxially therewith;
wherein the shock includes an axially threaded end; and
wherein ride height of the front suspension is adjusted by raising or lowering the axially threaded end of the shock with respect to the steering tube.

2. The front suspension of claim 1 wherein the ride height is adjusted without a need to adjust the coupling of the forks to the upper and lower triple clamps.

3. The front suspension of claim 1 further comprising a shock tube disposed within the steering tube.

4. The front suspension of claim 3 wherein the ride height is adjusted by using the axially threaded end of the shock to raise or lower the shock with respect to the shock tube.

5. The front suspension of claim 3 further comprising a spring located at least partially within the shock tube.

6. The front suspension of claim 1 wherein the shock extends out of the steering tube.

7. The front suspension of claim 6 wherein a lower end of the shock engages a fork buttress at an upper end of a fork bottom.

8. The front suspension of claim 1 wherein adjustments to the shock can be made from a top end of the steering tube.

9. A front suspension for a motorcycle comprising:
a subassembly including:
an upper triple clamp,
a lower triple clamp,
a pair of telescopic forks coupling the upper and lower triple clamps to a wheel, and
a steering tube coaxial with a steering axis and coupled to the upper and lower triple clamps; and further comprising:
a shock tube coupled to bearings and disposed within the steering tube, wherein the shock tube is adapted to retain a suspension component at least partially within the shock tube, and wherein adjustments including varying a ride height setting of the suspension component can be made without having to separately adjust one of the triple clamps with respect to the telescopic forks or the steering tube.

10. The front suspension of claim 9 wherein the adjustments to a setting of the suspension component include varying rebound damping.

11. The front suspension of claim 9 wherein the adjustments to a setting of the suspension component include varying spring preload.

12. The front suspension of claim 9 wherein the adjustments to a setting of the suspension component include varying compression damping.

13. A front suspension for a motorcycle comprising:
a subassembly including:
an upper triple clamp,
a lower triple clamp,
a pair of telescopic forks coupling the upper and lower triple clamps to a wheel, and
a steering tube coaxial with a steering axis and coupled to the upper and lower triple clamps; and further comprising:
a shock tube coupled to bearings and disposed within the steering tube, and a top bolt substantially coaxial with the steering tube and coupling the upper triple clamp to the shock tube, and wherein the shock tube is adapted to retain a suspension component at least partially within the shock tube, and wherein adjustments to a setting of the suspension component can be made without having to separately adjust one of the triple claims with respect to the telescopic forks or the steering tube.

14. The front suspension of claim 13 wherein the top bolt permits access to making adjustments to the setting of the suspension component.

15. A front suspension for a motorcycle comprising:
an upper triple clamp;
a lower triple clamp;
a pair of fork tubes coupling the upper and lower triple clamps to a wheel;
a steering tube coupled to the upper and lower triple clamps;
a shock tube disposed within the steering tube, wherein the shock tube includes a threaded passage extending axially of the shock tube; and
a suspension component disposed at least partially within the shock tube; wherein ride height of the front suspension is adjusted by raising or lowering the suspension component with respect to the shock tube.

16. The front suspension of claim 15 wherein the suspension component includes a shock.

17. The front suspension of claim 15 wherein the suspension component includes a spring.

18. The front suspension of claim 15 wherein the suspension component includes a threaded rod for coupling with the threaded passage.

19. The front suspension of claim 15 wherein a top of the front suspension provides access to the suspension component within the shock tube, to adjust the ride height.

* * * * *